US 8,267,252 B2

(12) United States Patent
Foreman et al.

(10) Patent No.: US 8,267,252 B2
(45) Date of Patent: *Sep. 18, 2012

(54) BATTERY HOLDER AND DISPENSING PACKAGE

(75) Inventors: Richard Foreman, Wayne, IL (US);
Kathleen Foreman, Wayne, IL (US);
Timothy Moreau, DeKalb, IL (US);
Brad Cherkas, Etobicoke (CA)

(73) Assignee: Tools Aviation, LLC, St. Charles, IL (US)

( * ) Notice: Subject to any disclaimer, the term of this patent is extended or adjusted under 35 U.S.C. 154(b) by 36 days.

This patent is subject to a terminal disclaimer.

(21) Appl. No.: 11/974,513

(22) Filed: Oct. 12, 2007

(65) Prior Publication Data

US 2008/0099370 A1    May 1, 2008

Related U.S. Application Data

(63) Continuation-in-part of application No. PCT/US2006/016129, filed on Apr. 27, 2006, and a continuation-in-part of application No. 11/218,874, filed on Sep. 2, 2005, now Pat. No. 7,287,648.

(60) Provisional application No. 60/755,234, filed on Dec. 12, 2005.

(51) Int. Cl.
*B65D 85/00* (2006.01)

(52) U.S. Cl. ........ 206/703; 206/477; 206/485; 206/462; D13/119

(58) Field of Classification Search ............... 206/703, 206/704, 705, 461, 462, 471, 477, 485, 338; 361/151; 224/902; 211/89.01
See application file for complete search history.

(56) References Cited

U.S. PATENT DOCUMENTS

| 2,385,400 | A | * | 9/1945 | Briggs | 206/705 |
| 2,772,407 | A | * | 11/1956 | Nichols | 340/321 |
| 3,255,879 | A | * | 6/1966 | Paige | 206/422 |
| 3,927,809 | A | * | 12/1975 | Klein, Sr. | 224/196 |
| 4,109,980 | A | | 8/1978 | Brockman et al. | |
| 4,510,215 | A | | 4/1985 | Adam | |
| 4,545,479 | A | * | 10/1985 | Figari | 206/5.1 |

(Continued)

FOREIGN PATENT DOCUMENTS

EP    0414644 A2    2/1997

(Continued)

OTHER PUBLICATIONS

European Search Report dated Mar. 10, 2011.

*Primary Examiner* — Mickey Yu
*Assistant Examiner* — Chun Cheung
(74) *Attorney, Agent, or Firm* — Erickson Law Group, PC

(57) ABSTRACT

A battery holding and dispensing device can hold a plurality of batteries, in an assortment of battery sizes. The battery holding and dispensing device includes a frame having a plurality of compartments sized and shaped to each receive a battery of a particular battery size and each having a detent for releasably retaining the battery in the compartment. Each compartment has at least one opening in the bottom and lower side to expose a corner of the battery to allow finger ejection of the battery from the compartment past the detent, and to allow the user to touch the batteries to ascertain battery size by feel. The assortment of batteries held in the frame is preferably pre-selected to correspond to the batteries needed by a particular profession. An arrangement for illuminating the frame is provided.

40 Claims, 14 Drawing Sheets

U.S. PATENT DOCUMENTS

| | | | |
|---|---|---|---|
| 4,696,402 A * | 9/1987 | Harmon et al. | 229/120.011 |
| 4,798,319 A * | 1/1989 | James, Jr. | 224/251 |
| D301,575 S | 6/1989 | Crawford, Jr. | |
| 5,137,693 A | 8/1992 | Mawhirt | |
| 5,249,681 A * | 10/1993 | Miller | 206/427 |
| 5,261,535 A | 11/1993 | Light et al. | |
| 5,369,565 A | 11/1994 | Chen et al. | |
| 5,378,433 A * | 1/1995 | Duckett et al. | 206/443 |
| D376,690 S | 12/1996 | Lockerby | |
| D380,611 S | 7/1997 | Mancusi | |
| 5,670,268 A | 9/1997 | Mancusi | |
| 5,823,350 A * | 10/1998 | Ward | 206/705 |
| 5,855,422 A | 1/1999 | Naef | |
| 5,866,276 A | 2/1999 | Ogami et al. | |
| D409,559 S | 5/1999 | Shim | |
| D409,560 S | 5/1999 | Shim | |
| 5,980,062 A | 11/1999 | Bell | |
| 6,174,618 B1 | 1/2001 | Nishiyama et al. | |
| D442,542 S | 5/2001 | Dougherty et al. | |
| D450,035 S | 11/2001 | Ahlgren | |
| 6,395,980 B2 | 5/2002 | Iitsuka | |
| 6,427,841 B2 * | 8/2002 | Wani et al. | 206/705 |
| D477,531 S | 7/2003 | Wilczewski | |
| 6,602,637 B1 | 8/2003 | Kurasawa et al. | |
| D483,722 S | 12/2003 | Bailey | |
| 6,677,728 B2 | 1/2004 | Takedomi et al. | |
| D488,443 S | 4/2004 | Bailey | |
| D490,375 S | 5/2004 | Pomerance | |
| 6,902,062 B1 * | 6/2005 | Kumakura et al. | 206/703 |
| 7,513,633 B2 * | 4/2009 | Ermeti | 206/573 |
| 2001/0046624 A1 | 11/2001 | Goto et al. | |
| 2003/0076673 A1 | 4/2003 | Diak/Ghanem | |

FOREIGN PATENT DOCUMENTS

| | | |
|---|---|---|
| FR | 2852584 | 9/2004 |
| JP | 46-006675 | 3/1971 |
| JP | 58-182261 U | 12/1983 |
| JP | 2024959 A | 1/1990 |
| JP | 02-024959 A | 1/1991 |
| JP | 09-323756 A | 12/1997 |
| JP | 2003-045390 A | 2/2003 |
| JP | 2004-220869 A | 8/2004 |

* cited by examiner

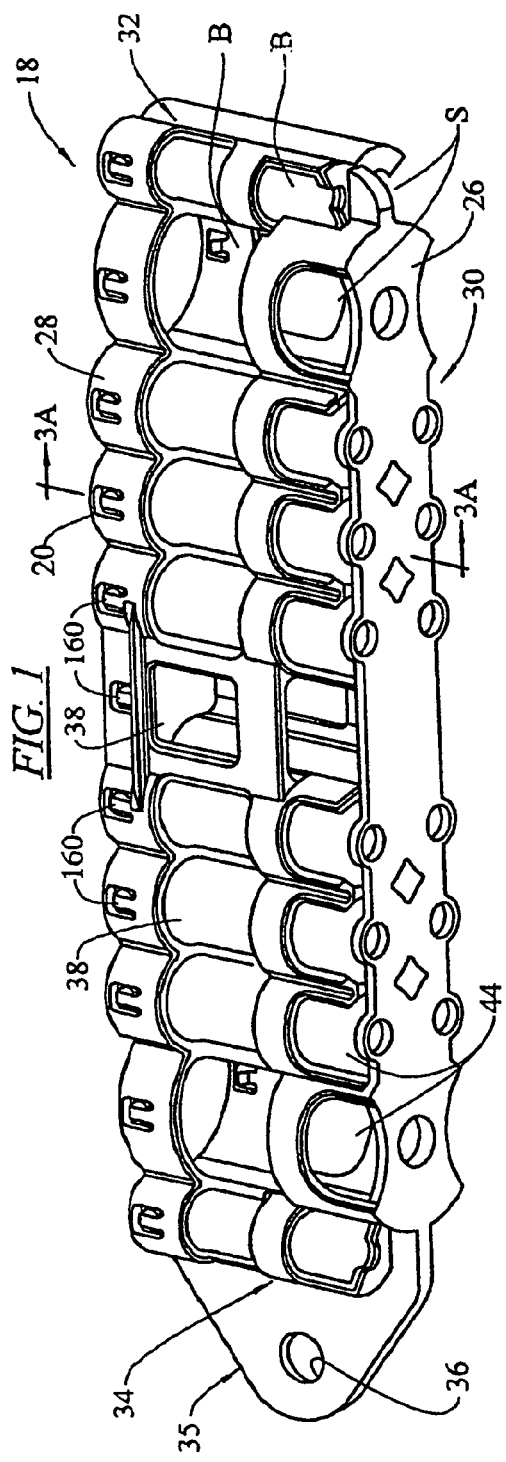
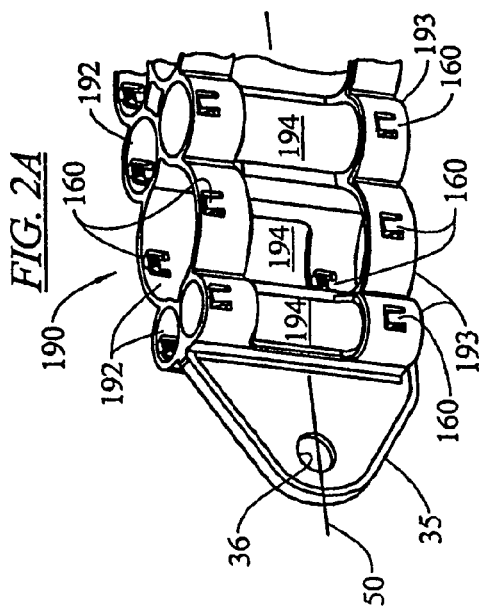
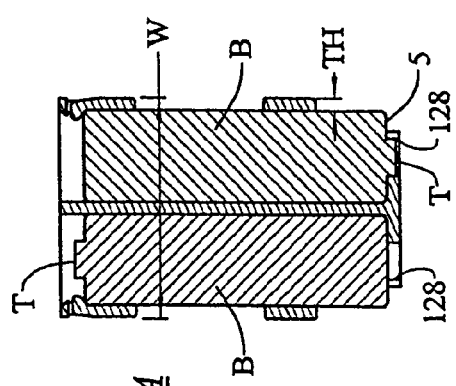

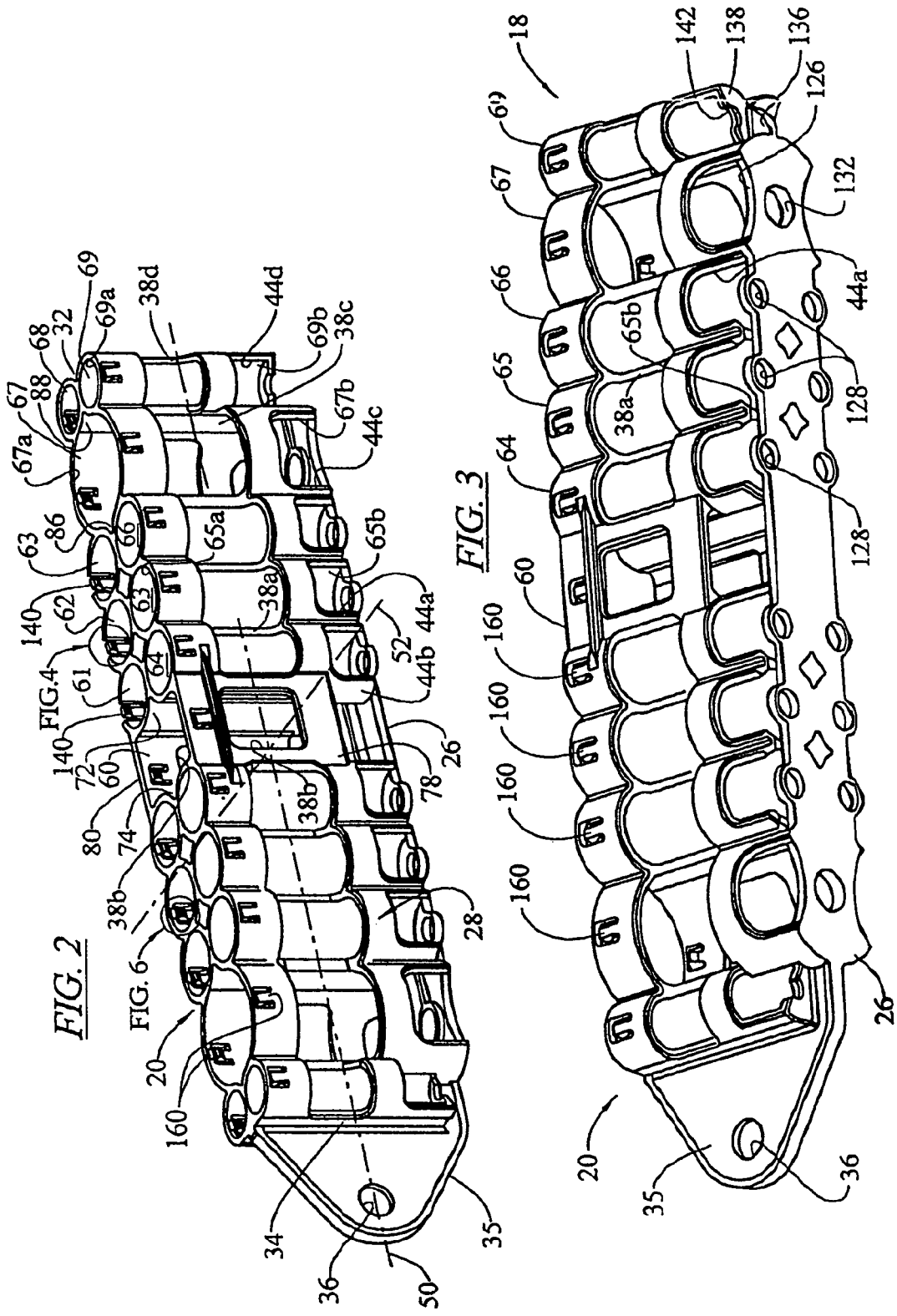

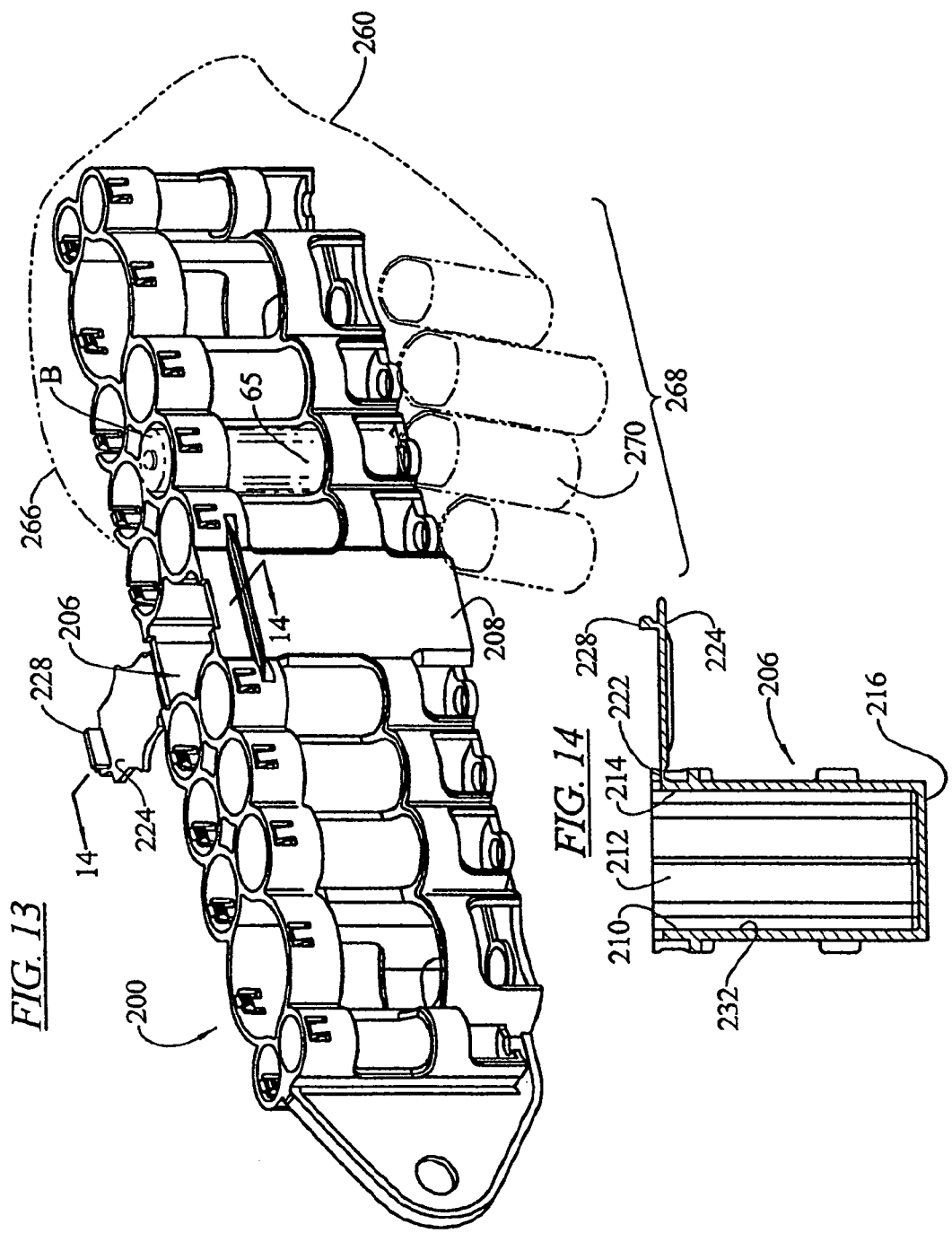

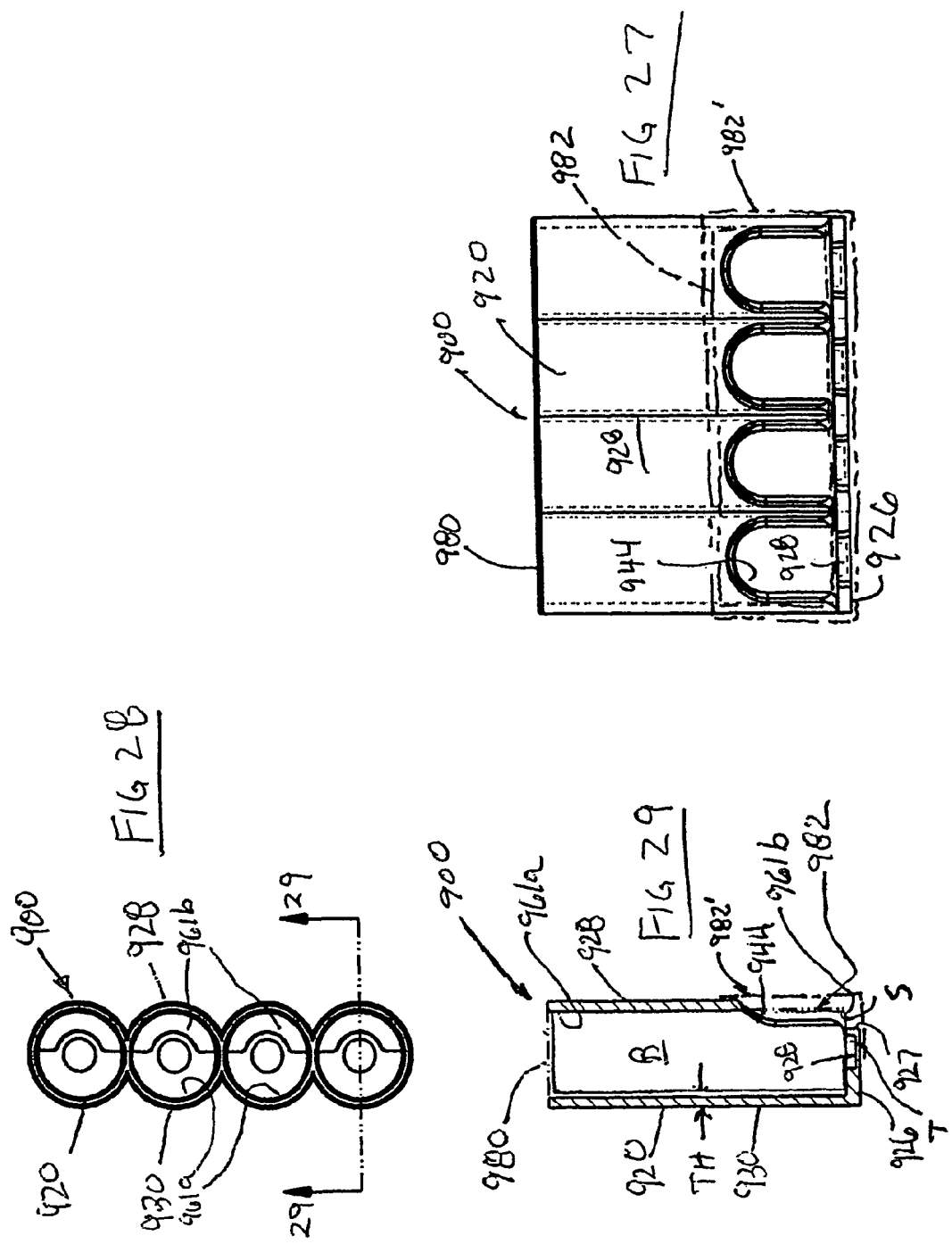

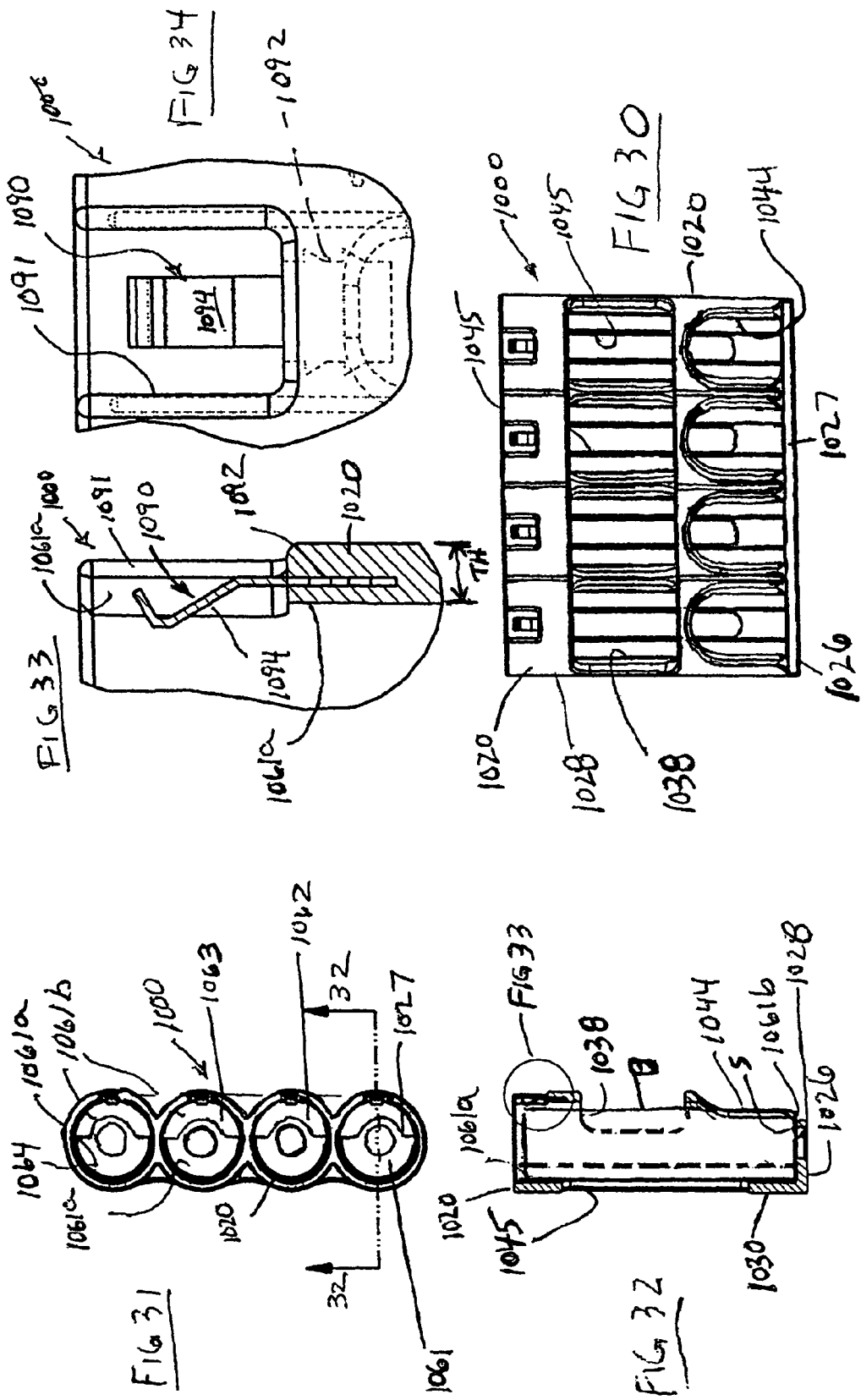

BATTERY HOLDER AND DISPENSING PACKAGE

This application is a continuation-in-part of PCT/US2006/016129, filed Apr. 27, 2006 which claims the benefit of U.S. Ser. No. 60/755,234, filed Dec. 12, 2005 and is a continuation-in-part of U.S. Ser. No. 11/218,874, filed Sep. 2, 2005.

TECHNICAL FIELD OF THE INVENTION

The present invention relates to a battery holder for use in storing, dispensing and packaging batteries.

BACKGROUND OF THE INVENTION

In the field of aviation, an airplane pilot is required to use many battery-powered devices, which devices serve either a primary or backup function. It is imperative that a pilot have ready access to a fresh supply of batteries in the event that batteries become inoperative or spent during flight. Some of these battery-powered devices include: handheld global positioning systems (GPS), handheld emergency radio transceivers, handheld calculators, "EGB"'s, flashlights, and intercom systems for additional communication headsets.

Different battery-powered devices use different size batteries. Batteries are available in standard sizes and voltages, such as sizes: AAA, AA, C, D and 9V. It has been known for pilots to carry an assortment of batteries loosely in a pilot's flight bag, a hand carried case used by pilots to carry personal items or small items needed in the performance of piloting an airplane. However, when a battery is required it must be located within the flight bag by the pilot during flight. During an emergency, if cabin lighting is lost or the pilot is preoccupied with controlling the aircraft, finding batteries loosely stored in a flight bag can be troublesome and time-consuming.

U.S. Pat. Nos. 5,670,268; 4,109,980; D490,375 and D301,575 describe various battery holding and storage devices.

The present inventors have recognized that in the aviation field particularly, there is a need for a battery holding and dispensing device that is compact, easy to locate in a dark environment, is conveniently sized to be carried in a pilot's flight bag, is easy to manipulate to dispense a desired battery even when in a dark environment, and can hold an assortment of batteries.

SUMMARY OF THE INVENTION

The present invention provides a battery holding and dispensing device that holds a plurality of batteries. The battery holding and dispensing device includes a frame having a plurality of compartments or bays for releasably retaining a battery in each compartment. The compartments are preferably sized and shaped to each receive a battery of the battery size corresponding to the compartment.

According to one aspect of the invention, the compartments in the frame are preferably sized and shaped to correspond to the batteries needed by a particular profession. For example, for an airline pilot, the frame includes compartments for the following battery sizes: (2) C's, (12) AA's, (4) AAA's and (1) 9V.

Although the invention is particularly advantageous for pilots, it also encompasses a battery holding and dispensing device that is adaptable for other professions that use batteries, such as for photographers, medical personnel such as paramedics, military personnel, etc. The invention is also suitable for home use as it provides a convenient holder for storing and dispensing batteries.

Preferably, each compartment of the frame of the present invention has an open top end and is open at least through an edge portion of a bottom thereof, to permit contact of a user's thumb or finger onto a bottom surface of the battery held within the compartment. Each compartment is also open along a lower portion of the sidewall of the compartment contiguous with the open edge portion. These openings allow the finger or thumb of the user to contact the bottom of the battery and induce ejection of a battery from the compartment, and through the top open end of the compartment.

One or both ends of the compartment can be partially closed by a releasable detent. The detent preferably extends into the compartment near to the open face and retains a battery within the compartment. If detents are used on both ends of the compartment, a battery held therein can be ejected through either top or bottom end. As an alternate to detents, bumps extending into the compartment from an inside surface of the compartment sidewalls, or ribs, or a soft liner portion within each compartment that is resiliently compressible to grip a battery held therein, or resilient compartment walls, can be used to releasably retain a battery within the frame. The bottom edge, side ant top openings allow the finger or thumb of the user to contact the bottom of the battery and induce ejection of a battery from the compartment, by moving the battery past the detent, and through the top open end of the compartment.

As a further embodiment of the invention, the detent can be a metal spring clip that is molded into an otherwise plastic frame.

One or more of the compartments can be formed with a lid. The corresponding compartment can be used to store small items, such as small watch batteries, flashlight bulbs, keys, pills, film, fuses, etc. Alternatively, a container corresponding substantially to the shape and volume of a battery, can be provided as an accessory item to be inserted into a corresponding battery compartment in the frame and to be releasably retained within the compartment in the same manner as a battery could be held within the compartment.

According to another aspect of the invention, the frame can be composed of a luminescent ("glow in the dark") plastic material. Accordingly, the battery holder and dispensing device can be easily located by a user in a dark environment, such as in a dark airplane cabin.

According to another aspect of the invention, the frame can be illuminated by one or more lamps that are powered by a battery within the frame. The lamps are preferably light emitting diodes (LED's). The lamps are preferably located within an interior portion of the frame and the frame is composed of a translucent or transparent plastic. The light emitted by the lamps will then diffuse throughout the frame to effectively provide a luminescent effect without the need for constructing the frame from a special luminescent plastic material. A switch can be provided to selectively power the lamps.

According to another aspect of the invention, a light accessory can be provided that comprises a separate sub frame having contacts and carrying at least one lamp wired to the contacts. A battery fit into the sub frame engages its terminals with the contacts and illuminates the lamp. The lamp is positioned to illuminate the frame when the sub frame is inserted into one of the bays of the frame. A switch usable to selectively power the lamp from the battery can be provided as part of the accessory.

According to another aspect of the invention, the frame can be assembled from modular sections or modules that releasably engage together. The modules can each contain a plurality of batteries of a single battery size, or can each contain a collection of different battery sizes. Thus, the particular battery needs of a selected profession can be accommodated by the selection of modules to be assembled together into a frame. The battery needs of the selected profession would depend on the battery-powered equipment used by that profession.

According to another aspect of the invention, the device is easily held in a user's one hand while a thumb or finger of the user's one hand can be used to eject a desired battery. Additionally, the user's hand can locate by feel the appropriate size battery due to the contour of the frame conforming to the battery sizes.

According to another aspect of the invention, a handle or bracket can be provided on an end of the frame for holding or hanging the frame. If the device is used in the home or workshop, the bracket can be used to hang the frame for convenient access to the batteries.

According to another aspect of the invention, the frame has a plurality of compartments or bays for releasably retaining a battery in each compartment. The compartments are preferably sized and shaped to each receive a battery of the battery size corresponding to the compartment.

Preferably, each compartment of the frame of the present invention has an open top end and is open at least through an edge portion of a bottom thereof, to permit contact of a user's thumb or finger onto a bottom surface of the battery held within the compartment. Each compartment is also open along a lower portion of the sidewall of the compartment contiguous with the open edge portion. Preferably, the open top end and the open portion of the bottom edge and sidewall can be covered by top and bottom membranes, such as film or foil seals, respectively. These openings allow the finger or thumb of the user to push through the bottom seal, or to push in the bottom seal, to the extent that allows the user to press the bottom of the battery and induce ejection of a battery from the compartment, by moving the battery through the top open end of the compartment. The top seal holds the battery within the compartment for retailing and storage purposes but will allow sufficient force from the user's finger to eject the battery through the top seal, breaking the seal. The bottom seal could be breakable or be a flexible or stretchable covering that need not be broken in order for the user to push up on the battery with a finger.

The top and bottom membranes close the openings of the frame and hold batteries therein. This can make the frame a package to hold batteries that is waterproof, or water resistant, and which resists infiltration of dirt and debris into the package. This aspect of the invention provides an attractive vehicle for marketing batteries and for retail sales of a battery and caddy combination.

The devices of the present invention provide further advantages over the known storage containers for batteries. The convenient and compact configurations of the frames of the devices allow the devices to be used in homes, planes, cars, offices and shops. The frames described herein keep batteries separated compared to loose batteries, to avoid inadvertent electrical contact between batteries. The compact arrangement and ergonomic shaping of the frames allows for easy handling of the frames and one-handed holding and dispensing of a selected battery. The open design of the sidewalls and a bottom wall of the frames allow the frames to shed debris which would otherwise collect in the compartments.

Numerous other advantages and features of the present invention will be become readily apparent from the following detailed description of the invention and the embodiments thereof, and from the accompanying drawings.

BRIEF DESCRIPTION OF THE DRAWINGS

FIG. 1 is a bottom perspective view of a device in accordance with the invention shown holding batteries;

FIG. 2 is a top perspective view of the device shown in FIG. 1 with batteries removed;

FIG. 2A is a fragmentary perspective view of an alternate embodiment of the device shown in FIG. 1;

FIG. 3 is a bottom perspective view of the device shown in FIG. 2;

FIG. 3A is a sectional view taken generally along line 3-3 of FIG. 1;

FIG. 13 is a top perspective view of an alternate embodiment device of the present invention;

FIG. 14 is a sectional view taken generally along line 14-14 of FIG. 13;

FIG. 27 is an elevation view of the battery holder of FIG. 26;

FIG. 28 is a plan view of the battery holder of FIG. 27;

FIG. 29 is a sectional view taken along line 29-29 of FIG. 28;

FIG. 30 is an elevation view of a still further embodiment battery holder of the invention;

FIG. 31 is a plan view of the battery holder of FIG. 30;

FIG. 32 is a sectional view taken along line 32-32 of FIG. 31;

FIG. 33 is an enlarged fragmentary sectional view taken from FIG. 32; and

FIG. 34 is a fragmentary right side view of FIG. 33.

DETAILED DESCRIPTION OF THE PREFERRED EMBODIMENTS

Figure 4:
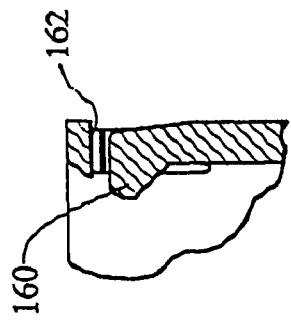
FIG. 4 is an enlarged detail view taken from FIG. 2.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a battery holding device 18 including a frame 20 that holds a plurality of batteries "B". The frame 20, as well as each of the alternate embodiment frames or modules described herein, is preferably a unitary molded piece. The frame 20 includes a bottom wall 26 sidewalls 28, 30 and end walls 32, 34. A bracket 35 extends from the end wall 34. The bracket can include an aperture 36 for hanging of the frame 20. The sidewalls 28, 30 include an upper row of openings 38 and a lower row of openings 44. The sidewalls 28, 30 have outside partial-cylindrical contours that are substantially parallel to the outside contours of the batteries held within the frame 20. Thus, even in a dark environment, a user can, by feel of the outside contour of the frame 20, ascertain the size of a battery held within the frame. Furthermore, the openings, either the upper row 38 or the lower row 44 can be sized sufficiently such that a user's finger can actually directly feel the outside contour of a battery held within the frame to determine the size of the battery, even in the dark.

The batteries held within the frame are exposed through the openings 38, 44. Furthermore, the bottom wall 26 is recessed adjacent each of the lower row of openings 44 such that a bottom surface "S" of a battery held within the frame is exposed to a user's touch.

According to the preferred embodiment illustrated in FIG. 1, the frame has an overall length "L" (FIG. 12), without the bracket 35, of about 197 mm, an overall height "H" (FIG. 3A) of about 54 mm, and an overall width "W" (FIG. 3A) of about 35 mm. The frame is preferably injection molded plastic having an average thickness "TH" (FIG. 3A) of about 2 mm.

FIG. 2 illustrates the frame 20 in more detail with the batteries removed. The frame 20 includes compartments or bays for receiving an assortment of batteries. According to the embodiment shown in FIGS. 1 and 2, the frame 20 is substantially mirror image identical across a longitudinal vertical center plane indicated by the centerline 50 and a lateral vertical center plane indicated by the centerline 52, except for the bracket 35.

In FIG. 2, an assortment of bays is provided to the right of the lateral centerline 52. Straddling the centerline 52 is a first bay 60 for holding a rectangular 9V battery. Adjacent first bay 60 are two rows of three bays for holding cylindrical, size AA batteries. These bays are marked 61-66. Adjacent to the bays 63, 66 is an eighth bay 67 for holding a size C battery. Adjacent to the bay 67 are bays 68, 69 for holding size AAA batteries. The bays to the left of the lateral centerline 52 are mirror image identical. Thus, the frame 20 illustrated can hold 19 batteries.

The bays 61-66 are formed as cylindrical tubes with open top and bottom ends and with portions removed. For example, the bay 65 includes an open top and 65a and an open bottom end 65b that is partially closed by the bottom wall 26. The bay 65 includes a lower sidewall opening 44a that is about 3/8 inch tall and circumscribes about 90° of the circumference of the cylindrical tube. The bay 65 includes an upper sidewall opening 38a that is about 7/8 inch in height and circumscribes about 180° of the cylindrical tube circumference. The remaining bays 61-64 and 66 are substantially identical to the bay 65 except that the bays 61, 64 have upper openings 38a that circumscribes about 130° of the circumference of the cylindrical tube.

The bays 61, 64 form an interior end wall 72 of the first bay 60. Likewise, the mirror image bays on the left side of the lateral centerline 52 form an opposite interior end wall 74 of the first bay 60. The first bay 60 includes a substantially flat first sidewall 78 and a substantially flat second sidewall 80. Lower substantially rectangular openings 44b are formed between the sidewalls 78, 80 and the bottom wall 26. Upper openings 38b are formed through the sidewall 78 and through the sidewall 80.

The bays 63, 66 form an interior sidewall 86 and the bays 68, 69 form an interior sidewall 88 of the bay 67. A cylinder that forms the bay 67, with portions removed as described below, blends into the sidewalls 86, 88. The cylinder includes an open top end 67a and an open bottom end 67b at least partially closed by the bottom wall 26. The cylinder includes two lower sidewall openings 44c, one on each side of the centerline 50, that are approximately 3/8 inch in height and each circumscribes approximately 90° of the circumference of the cylinder. The cylinder includes two upper sidewall openings 38c, one on each side of the centerline 50, that are approximately 7/8 inch in height and each circumscribes approximately 120° of the circumference of the cylinder.

The bays 68, 69 are each formed by a cylinder having portions removed as described below. For example, the bay 69 includes an open top end 69a and an open bottom end 69b. A lower opening 44d is approximately 3/8 inch in height and circumscribes about 180° of the circumference of the cylinder. An upper opening 38d is about 5/8 inch in height and circumscribes approximately 180° of the circumference of the cylinder.

As shown in FIG. 3, the bottom wall 26 includes an irregular longitudinal edge 126 that extends along the longitudinal extent of the frame 20 except for the bays 68, 69. The edge 126 is recessed from a lateral extent of the bays to form bottom openings to expose the bottom surface "S" of the batteries "B" held within the bays to a user's touch to allow the user's finger to press the batteries from below. The lower sidewall openings 44a-44d of the bays are contiguous with the bottom openings formed by the edge 126 to allow the user's finger to not only press the bottom surface "S" of the batteries but to slide the batteries toward the top open ends of the bays to eject the batteries.

The bottom wall provides apertures 128 for the bays 61-66 to receive the positive terminal "T" of a typical battery "B". The bottom wall also includes an aperture 132 in bay 67 for receiving the terminal of a typical battery. As shown in FIG. 3A, because of the apertures 128, a battery can be put into the compartment with the extending terminal either oriented at the top or bottom of the battery.

The bays 68, 69 include a support gusset 136 that supports a bottom wall portion 138 for holding batteries within the bays 68, 69. The bottom wall portion 138 includes a partial aperture 142 for receiving a terminal of a typical battery.

Each of the bays 60-69 includes a mechanism for releasably holding a battery within the individual bays. According to the preferred embodiment, the mechanism comprises one or two resilient detents or hooks which overlies or protrudes into the bay near to the otherwise open end of each bay. The detents are resiliently flexible outwardly to allow battery to be removed through the open end of each bay.

Figure 5:
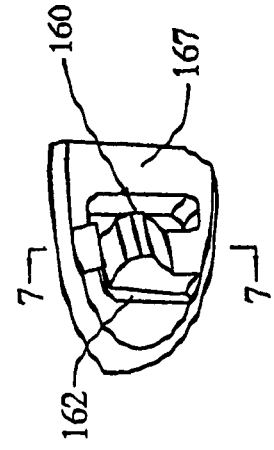
FIG. 5 is a sectional view taken generally along line 5-5 of FIG. 4
Figure 6:
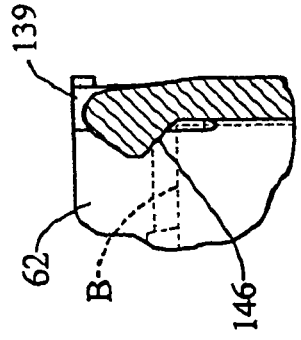
FIG. 6 is an enlarged detail view taken from FIG. 2.
Figure 7:
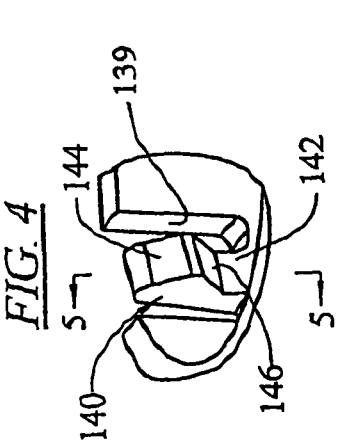
FIG. 7 is a sectional view taken generally along line 7-7 of FIG. 6.
Figure 8:
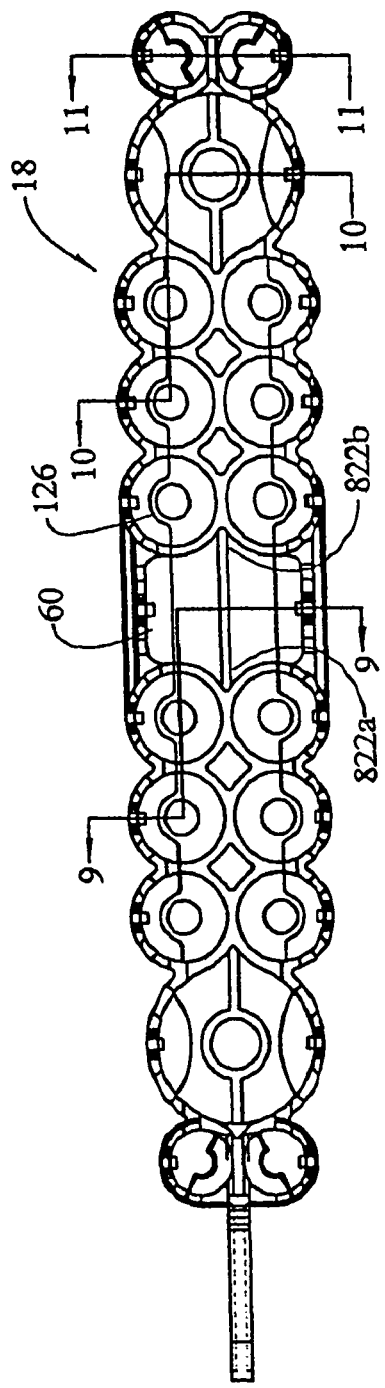
FIG. 8 is a top plan view of the device shown in FIG. 2.
Figure 9:
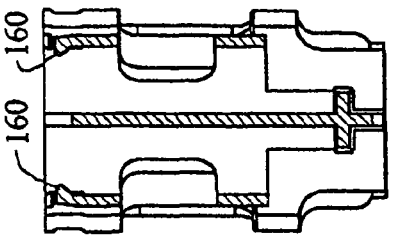
FIG. 9 a sectional view taken generally along 9-9 of FIG. 8.
Figure 10:
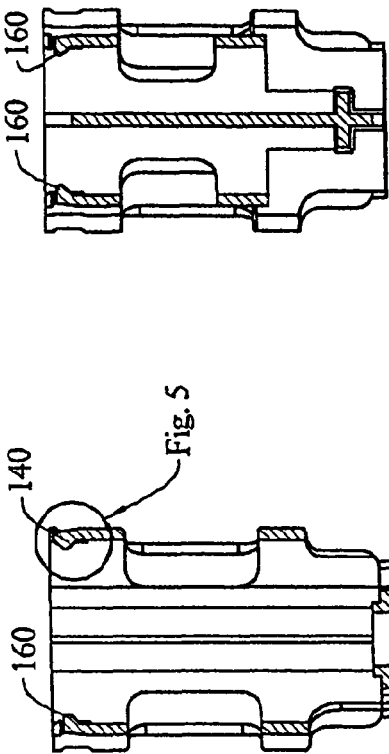
FIG. 10 is a sectional view taken generally along line 10-10 of FIG. 8.
Figure 11:
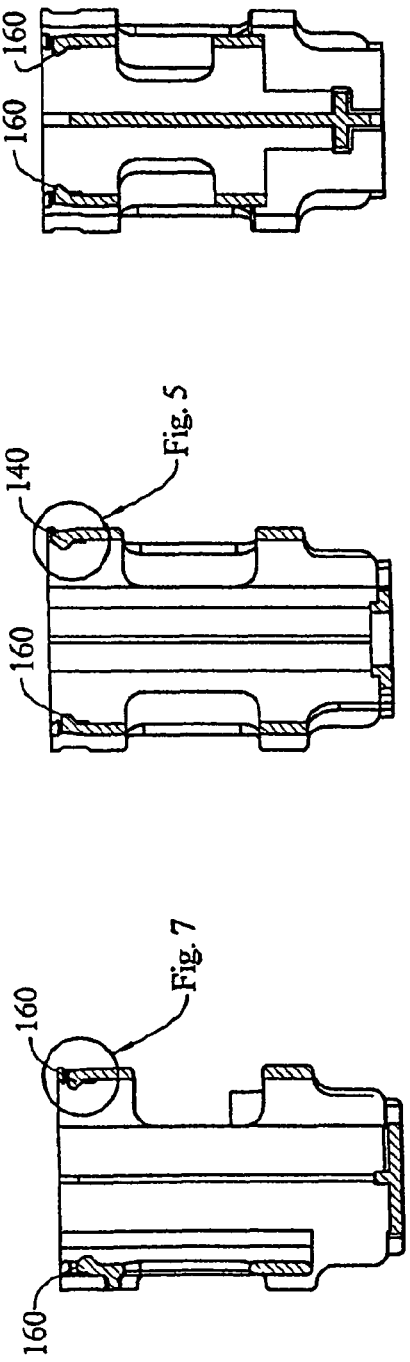
FIG. 11 is a sectional view taken generally along line 11-11 of FIG. 8.

FIG. 2 illustrates two variations of the detent structures. Although two variations are described, in practice, probably one detent structure or the other would be used for all the detent structures. A first variation in shown in FIGS. 4-5 and a second variation is shown in FIGS. 6-7. FIG. 4 shows a sidewall of the bay 62 having a slot opening 139 and a detent 140 formed within that slot opening. The detent 140, due to the cantilever arrangement, exhibits a resilient flexibility. The detent includes a neck portion 142 and a head portion 144 extending therefrom. The head portion 144 includes a ramp surface 146 which allows the detent 140 to flex outwardly as a battery B (shown dashed in FIG. 5) is forcibly ejected through the top open end of the bay 62

FIGS. 6 and 7 illustrate an alternate embodiment for the detent, a detent 160 which is shaped similarly to the detent 140. However, according to this embodiment the detent is formed within a closed opening 162 in the sidewall of the bay 67, not a slotted opening.

As can be observed in the figures, the smaller bays 61-66 and 68, 69 each include a single detent, while the larger bay 60, 67 include two detents, that are opposing across a width of the bays 60, 67.

FIG. 2A illustrates an alternate embodiment frame 190 wherein each bay includes a top open end 192 and a bottom open end 193, and at least one central sidewall opening 194. Each bay includes one or two detents 160 (or 140) adjacent the open ends 192, 193. A battery can be ejected through either the top open end or the bottom open end. According to this embodiment, the frame 190 is also configured to be mirror image identical across a horizontal plane that contains the centerline 50, 52.

As an alternate to detents, bumps extending into the compartment from an inside surface of the compartment sidewalls, or ribs, or a soft liner portion within each compartment that is resiliently compressible to grip a battery held therein, or resilient compartment walls, can be used to releasably retain a battery within the frame.

FIGS. 8 through 12 illustrate additional views of the device 20 for further understanding of the structure.

FIGS. 13 and 14 illustrate an alternate embodiment device 200 wherein the bay 60 of the previous embodiment is replaced with a box-like container 206. The box-like container 206 includes substantially solid sidewalls 208, 210, 212, 214 and a solid bottom wall 216. A film hinge 222 connects a lid 224 to the sidewall 214. The lid 224 includes a resilient catch 228 which, once the lid is pressed closed onto the container 206, resiliently engages a groove 232 to hold the lid closed onto the container 206. The container 206 is conveniently used for holding small items, such as small watch batteries, flashlight bulbs, keys, pills, film, fuses, etc.

FIG. 13 also illustrates that the compact arrangement of batteries in the frame 200, or similarly the first described frame 20, is such that the frame can be held in a user's hand 260 (shown in phantom), clasped between a user's thumb 266 and fingers 268, and resting in a user's palm, whereas a finger 270 can simultaneously be used to eject a battery "B" from a bay, in this example the bay 65.

Figure 15:
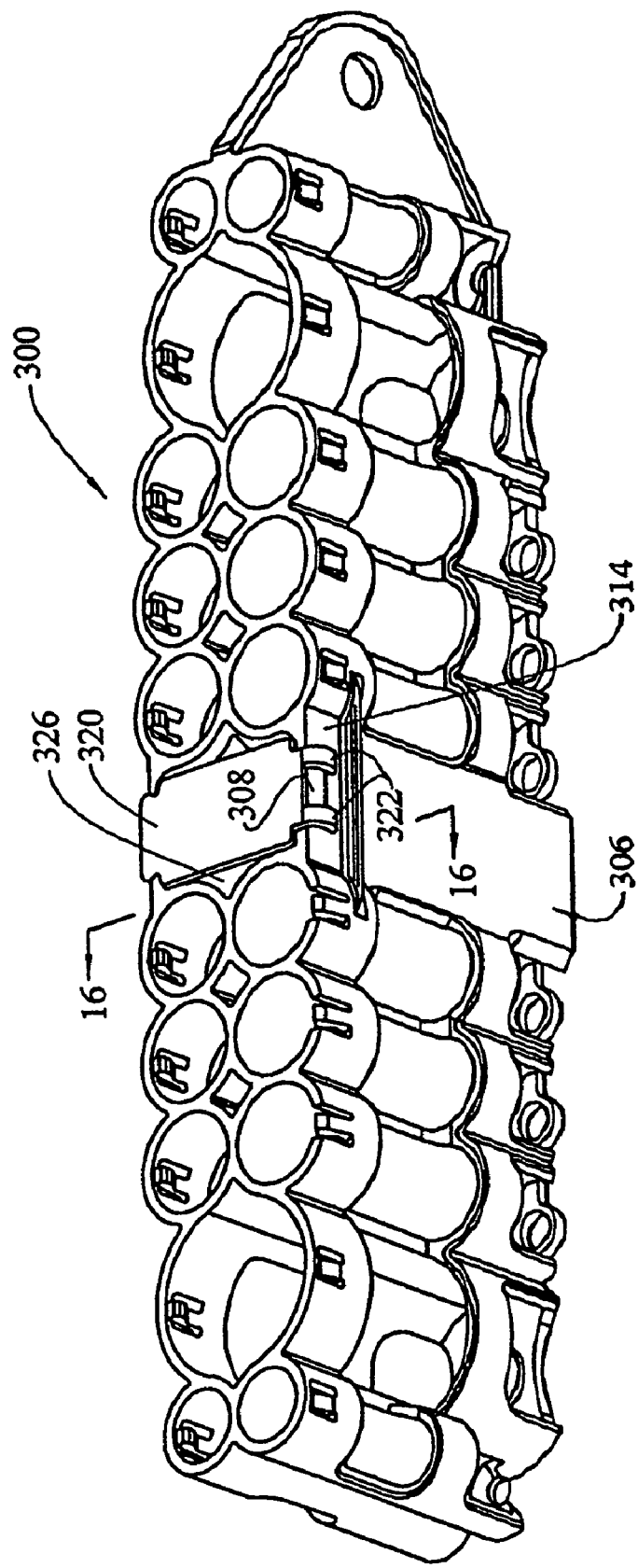
FIG. 15 is a top perspective view of a further embodiment of the device in accordance with the present invention.
Figure 16:
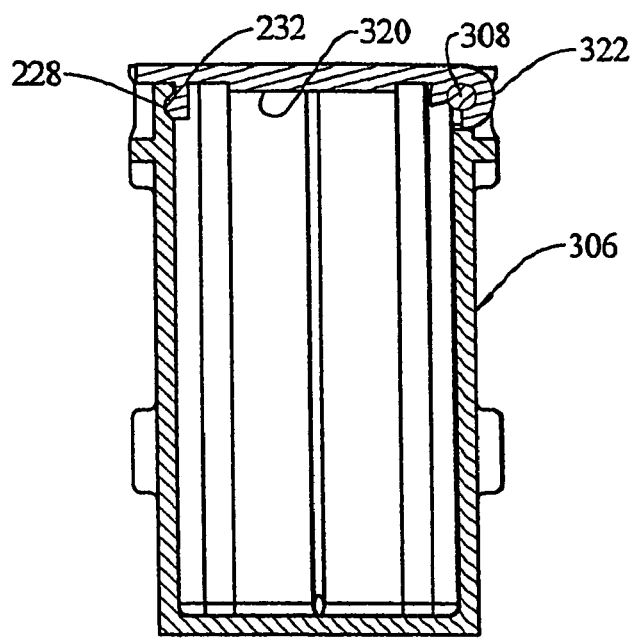
FIG. 16 is a sectional view taken generally along line 16-16 of FIG. 15.

FIGS. 15 and 16 illustrate a further embodiment device 300, similar to the embodiment 200 described in FIGS. 13 and 14 but with a modified container 306. Rather than a film hinge, a rounded pin 308 is formed onto a sidewall 314 of the container 306. A lid 320 is hingedly engaged to the pin 306, by C-shaped portions 322, in snap fit fashion. The lid 320 need not completely cover an open top 326 of the container 306 as shown. Such a configuration would allow a user to view into the container 306, through the areas on opposite sides of the lid 320, at least to a limited extent. The remaining portions of this container 306 are similar to the container 206.

Figure 17:
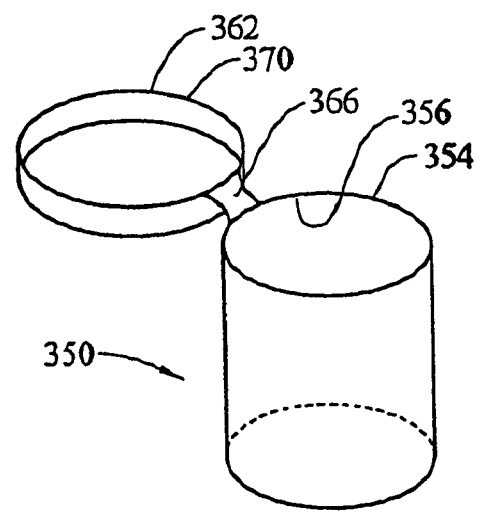
FIG. 17 is a top perspective view of an accessory usable with one or more of the previous embodiment devices.

FIG. 17 illustrates an accessory container 350 that can be used in any of the heretofore described embodiments. The container 350 includes a cylindrical body 354 having an open top 356 and a closed bottom 360. A lid 362 is connected to the body 354 by a film hinge 366. As can be readily understood, the lid 362 can be folded over and pressed down around the body 354 to close the open top 356 to form an enclosed container. Sidewalls 370 of the lid 362 are sized to the resiliently engaged by the body 354 to hold the lid in the closed configuration. The container 350 is sized and shaped substantially identically to a C size battery. Thus, the container 350 can be held in any of the compartments sized and shaped to hold a C size battery, such as the bay 67 shown in FIG. 2.

Figure 18:
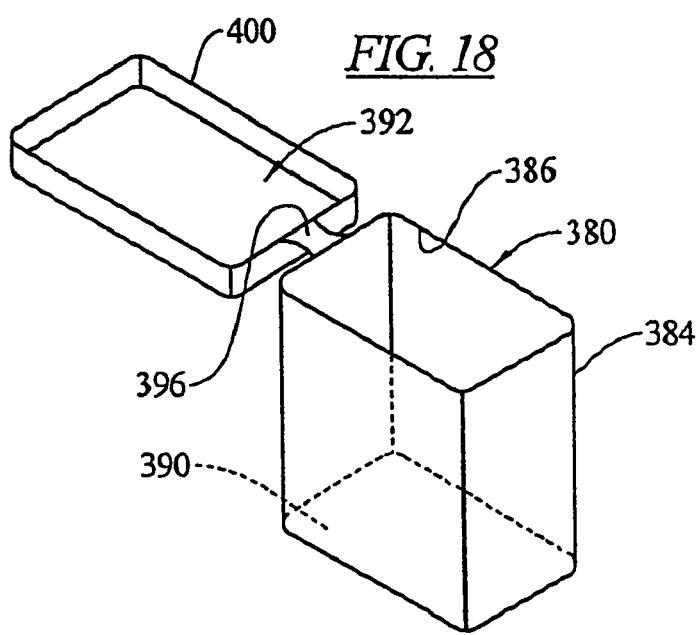
FIG. 18 is a top perspective view of a further accessory usable with one or more of the previously described embodiments.

FIG. 18 illustrates a further accessory container 380 that can be used in any of the heretofore described embodiments. The container 380 includes a rectangular body 384 having an open top 386 and a closed bottom 390. A lid 392 is connected to the body 384 by a film hinge 396. As can be readily understood, the lid 392 can be folded over and pressed down around the body 384 to close the open top 386 to form an enclosed container. Sidewalls 400 of the lid 392 are sized to the resiliently engaged by the body 384 to hold the lid in the closed configuration. The container 380 is sized and shaped substantially identically to a 9V size battery. Thus, the container 380 can be held in any of the compartments sized and shaped to hold a 9V size battery, such as the bay 60 shown in FIG. 2.

Figure 19:
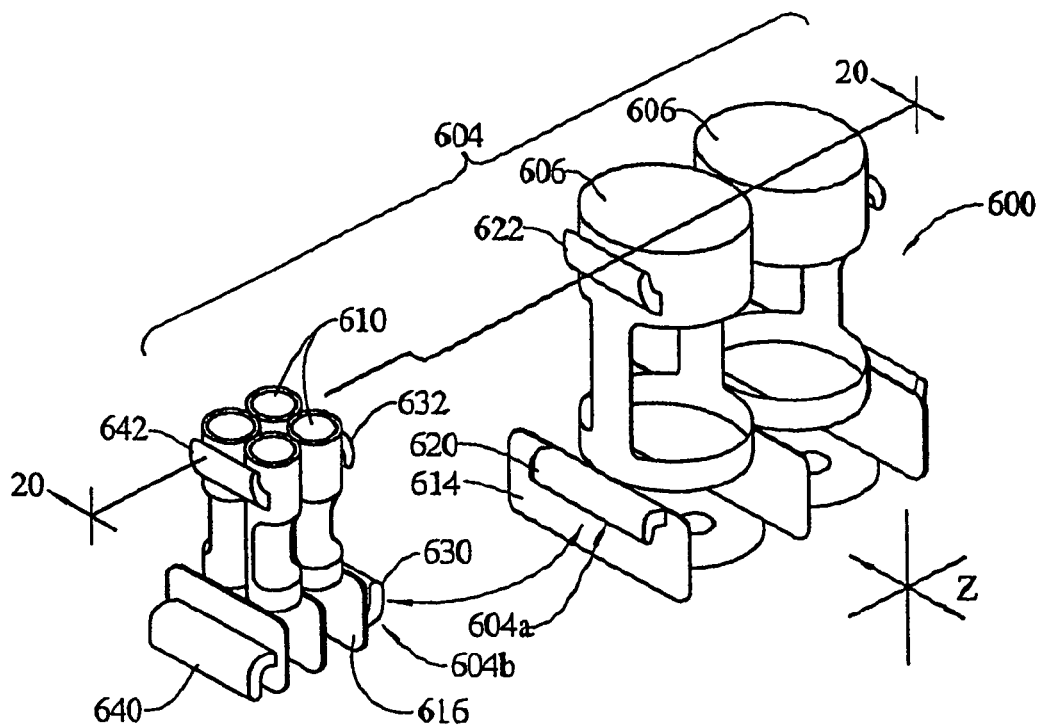
FIG. 19 is a fragmentary, exploded elevational view of a further embodiment of the invention.
Figure 20:
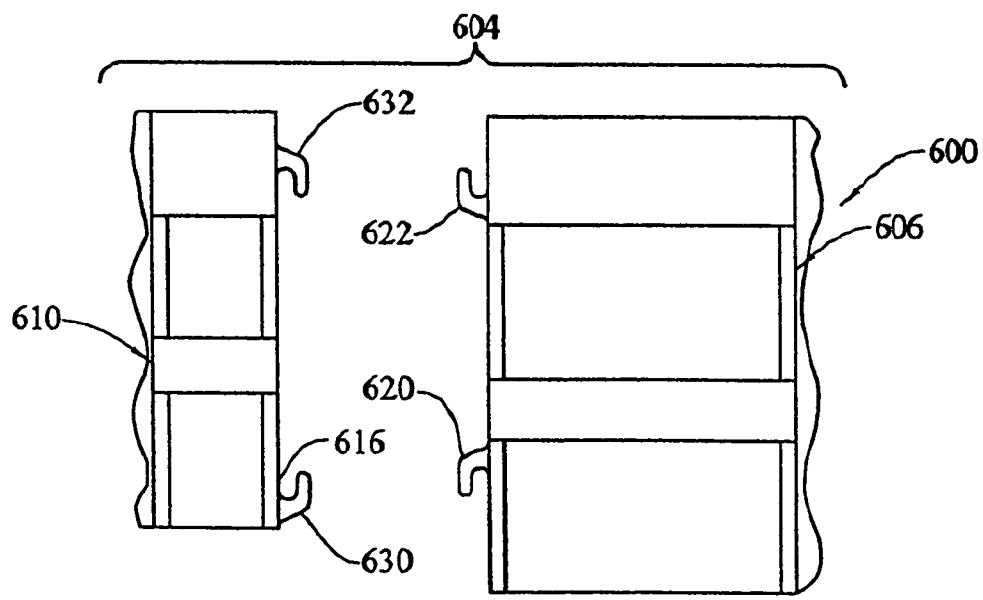
FIG. 20 is a fragmentary sectional view taken generally along line 20-20 of FIG. 19.

FIGS. 19 and 20 illustrate a further aspect of the invention wherein a device 600 includes a frame 604 that is modular in construction. A first frame module 604a is connectable to a second frame module 604b. The first frame module 604a includes a plurality of bays 606. The bays 606 illustrated are configured and sized to hold D size batteries. The second frame module 604b includes a plurality of bays 610. The bays 610 illustrated are configured and sized to hold MA size batteries.

The first frame module 604a includes a base frame rail 614 that is connected to, or molded with, the bays 606. The second frame module 604b includes a base frame rail 616 that is connected to, or molded with, the bays 610. The first frame module 604a includes hooks 620, 622 that curve away from each other. The hook 620 is molded with the base frame rail 614. The hook 622 is molded with an upper portion of one of the bays 606. The hooks 620, 622 are substantially vertically aligned. The second frame module 604b includes hooks 630, 632 that curve toward each other. The hook 630 is molded with the base frame rail 616. The hook 632 is molded with an upper portion of one of the bays 610. The hooks 630, 632 are substantially vertically aligned.

Figure 21:
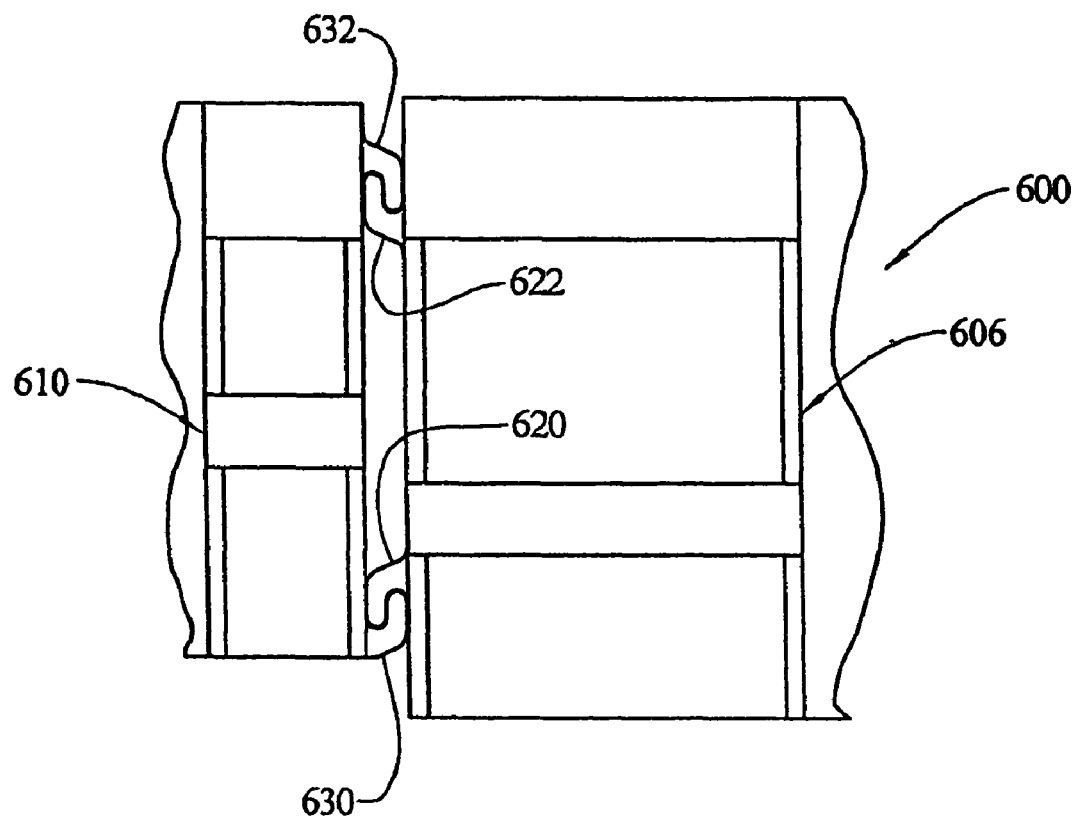
FIG. 21 is a fragmentary sectional view taken generally along line 20-20 of FIG. 19, but showing the device in an assembled condition.

To assemble the frame 604, the modules 604a, and 604b are relatively slid along the direction "Z" to interlock the hooks as shown in FIG. 21.

To enhance versatility of assembling modules, each module 604a, 604b includes, on a side opposite to the heretofore described hooks 620, 622 and 630, 632, additional hooks having an opposite curvature. For example, the module 604b includes hooks 640, 642 that curve away from each other, identically configured to the hooks 620, 622 of the module 604a. Thus, a series of modules identical to the module 604b could be assembled together, with hooks 630, 632 engaged to hooks 640, 642 of a like module, engaged in similar fashion to that shown in FIG. 21. A stack of modules of like or unlike types can be assembled in series, or "daisy chained", to form a modular frame.

Thus, one group of bays 606 that are sized and shaped for holding one or more batteries can be attached to one or more bays 610 sized and shaped to hold one or more batteries of a same size as the batteries held in bays 606, or a different size as illustrated in FIGS. 19 and 20. FIGS. 19 and 20, for simplicity of illustration, illustrate only a few bays 606 and a few bays 610, it should be understood however that any number of bays within a module could be configured into a modular frame. Also, the parting plane of the modules could be across a vertical lateral plane, or across a vertical longitudinal plane, or across a horizontal plane, taken with the device oriented upright as shown in FIG. 2.

According to the preferred embodiments, the heretofore described frames are composed of a suitable plastic such as polypropylene or polycarbonate, and are preferably injection molded. As an enhancement, the plastic can be a phosphorescent resin such as a Resin Series 100(PP) polypropylene or Series 300(PC) polycarbonate available from RTP Company of Winona, Minn., USA. Such plastics will make the frames luminescent ("glow in the dark"). Accordingly, the frames will glow after absorbing light and can be easily located and handled even in a dark room or in a dark airplane cabin.

Figure 22:
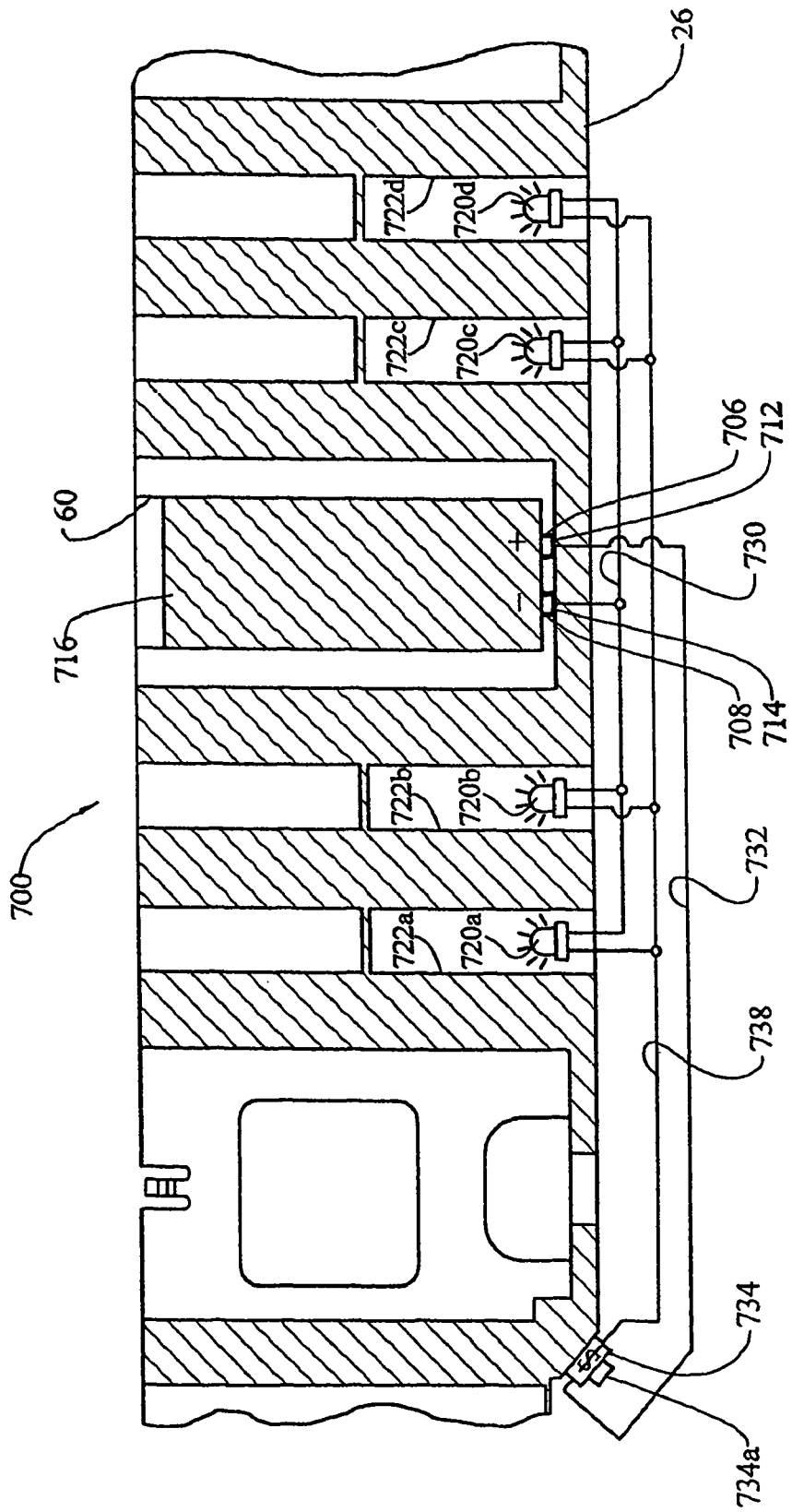
FIG. 22 is a fragmentary, schematical sectional view of an alternate embodiment of the invention.

FIG. 22 illustrates an alternate embodiment 700 that can be configured in accordance with any of the heretofore described embodiments except as modified as described. For example the frame 700 can be configured substantially identically to the frame 20 shown in FIG. 1. The frame 700 includes contacts 706, 708 imbedded into, or otherwise carried by, the bottom wall 26 of the frame. The contacts 706, 708 are configured to engage the corresponding contacts 712, 714 of an inverted, rectangular 9 volt battery 716. A plurality of lamps 720a, 720b, 720c, 720d are arranged each within one void 722a, 722b, 722c, 722d that are arranged within the frame 20, 700.

Figure 12:
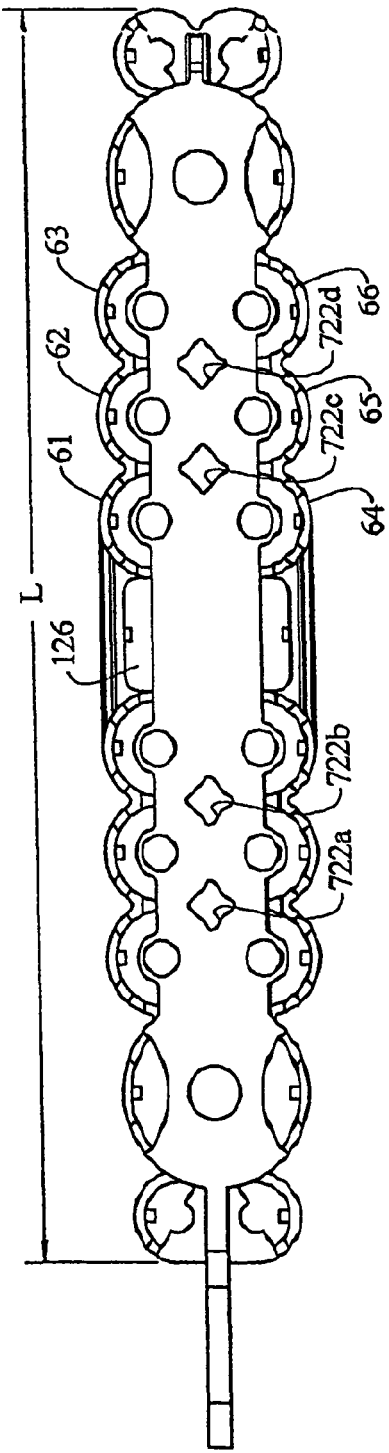
FIG. 12 is a bottom view of the device of FIG. 2.

As illustrated in FIGS. 12 and 22, the void 722c is formed centrally between the four bays 61, 62, 64, 65 and the void 722d is formed centrally between the four bays 62, 63, 64, 65. The voids 722a, 722b are similarly formed on an opposite longitudinal side of the frame 20, 700.

The lamps 720a, 720b, 720c, 720d are preferably light emitting diodes (LED's). Although four lamps are shown, any number equal to or greater than one is encompassed by the invention.

One contact, such as the negative contact 708, is wired in parallel to a first contact of each lamp 720a, 720b, 720c, 720d, via a wire system or bus 730. The respective other contact, such as the positive contact 706 is wired via a lead 732 to a switch 734. The switch 734 includes a button or slide 734a operable by the user to change the open/closed state of the switch 734. The switch 734 is wired via a wire system or bus 738 to a second contact of each lamp 720a, 720b, 720c, 720d. Preferably the wire systems and lead 730, 732, 738 are embedded into the bottom wall 26 of the frame 700. The wire systems and lead can be actual wires or printed or deposited conductors, such as used in a printed circuit board. The lamps 720a, 720b, 720c, 720d can be embedded into the bottom wall 26 or frictionally or adhesively fit or otherwise fixed into the voids 722a, 722b, 722c, 722d.

The switch 734 can be located on either end of the frame or anywhere else on the frame. The switch can be embedded into a wall of the frame or otherwise secured to the frame.

Figure 25:
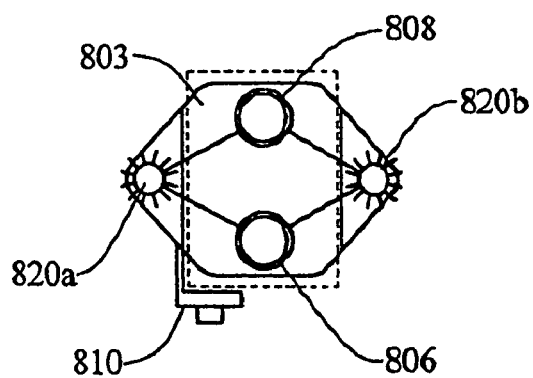
FIG. 25 is a top view of the accessory of FIG. 23.
Figure 23:
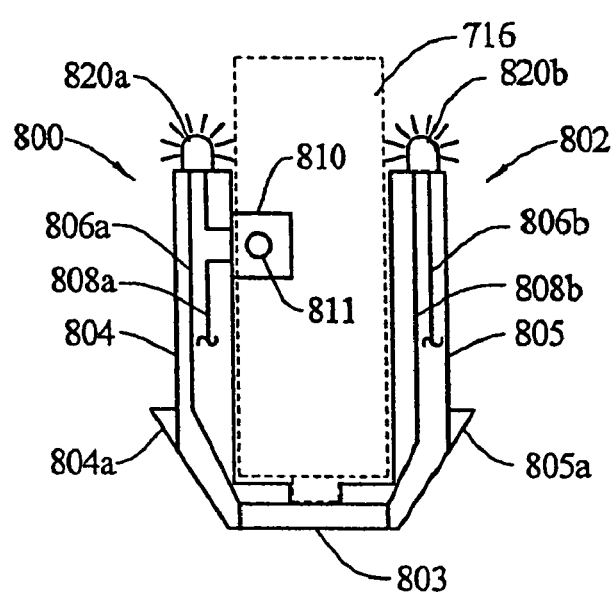
FIG. 23 is a front side view of a further accessory useable with the present invention.
Figure 24:
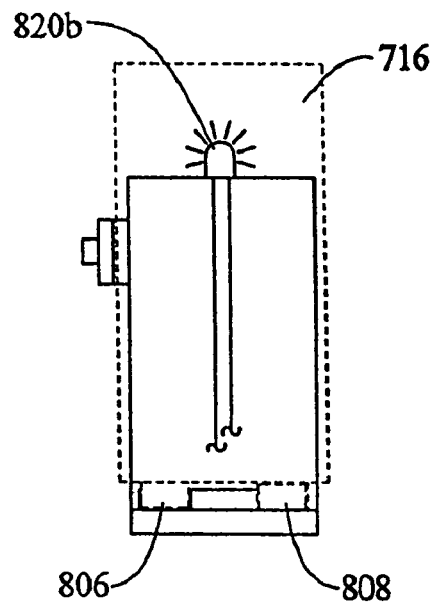
FIG. 24 is a right side view of the accessory of FIG. 23.

FIGS. 23-25 illustrates an alternate accessory 800 that can be configured to be usable with any of the heretofore described embodiments. For example the accessory 800 can be configured to fit within the central bay 60 of the frame 20 shown in FIGS. 1 and 2. The accessory 800 includes a sub frame 802 having a bottom wall 803 and upright side walls 804, 805. The sub frame can be composed of an optical grade plastic. Contacts 806, 808 are imbedded into, or otherwise carried by, the bottom wall 803 of the sub frame 802. The contacts 806, 808 are configured to engage the corresponding contacts of an inverted, rectangular 9 volt battery 716 (shown in phantom).

Lamps 820a, 820b are carried by the upright walls 804, 805 respectively at an elevation approximately half way up the height of the battery 716. The lamps 820a, 820b can be wired to the contacts 806, 808 by leads 806a, 806b; 808a, 808b embedded into, or guided by, the walls 804, 805 and bottom wall 803 of the sub frame 802. The contacts 806, 808 and the leads 806a, 806b, 808a, 808b can be overmolded with the optical grade plastic of the sub frame.

A switch 810 can be provided wired into said leads. The switch provides a lever or button 811 which selectively connects the lamps 820a, 820b to the battery 716 via the contacts 806, 808. The button is preferably located on the sub frame 802 at a position to be finger accessible through the frame 20, when the sub frame is installed on the frame. The switch 810 can be located on any side or bottom of the frame or anywhere else on the frame. The switch can be embedded into a wall of the frame or otherwise secured to the frame. The switch 810 is optional as the means of turning on the lamps can be merely the snapping of the battery 716 down onto the contacts 806, 808. When the sub frame 802 is placed into the bay 60, the lamps 820a, 820b are received into triangular voids 822a, 822b shown in FIG. 8. When powered by the battery 716, the lamps 820a, 820b will illuminate the frame 20 by conduction of light throughout the frame 20, given a selection of translucent material for the construction of the frame.

The lamps 820a, 820b are preferably light emitting diodes (LED's). Although two lamps are shown, any number equal to or greater than one is encompassed by the invention.

The side walls 804, 805 each include a prong 804a, 805a for removably securing the sub frame 202 to the frame 20 in a snap fitting fashion.

FIGS. 26-29 illustrate an alternate battery holding device 900 including a frame 920 that can hold a plurality of batteries "B" (FIG. 29). The frame 920 is preferably a unitary molded plastic piece. The frame 920 includes a bottom wall 926 and sidewalls 928, 930. At least one of the sidewalls 928 includes a lower row of openings 944. The sidewalls 928, 930 have outside contours that are substantially parallel to the outside contours of the batteries held within the frame 920. Thus, even in a dark environment, a user can, by feel of the outside contour of the frame 920, ascertain the size of a battery held within the frame. According to the illustrated embodiment, the frame holds four M size cylindrical batteries.

The sidewall openings 944 can be sized sufficiently such that a user's finger can actually directly feel the outside contour of a battery held within the frame to determine the size of the battery, even in the dark.

The batteries held within the frame 920 can be exposed through the openings 944. Furthermore, the bottom wall 926 is recessed adjacent to the lower row of openings 944 such that a bottom surface "S" of a battery held within the frame can be exposed to a user's touch.

Figure 26:
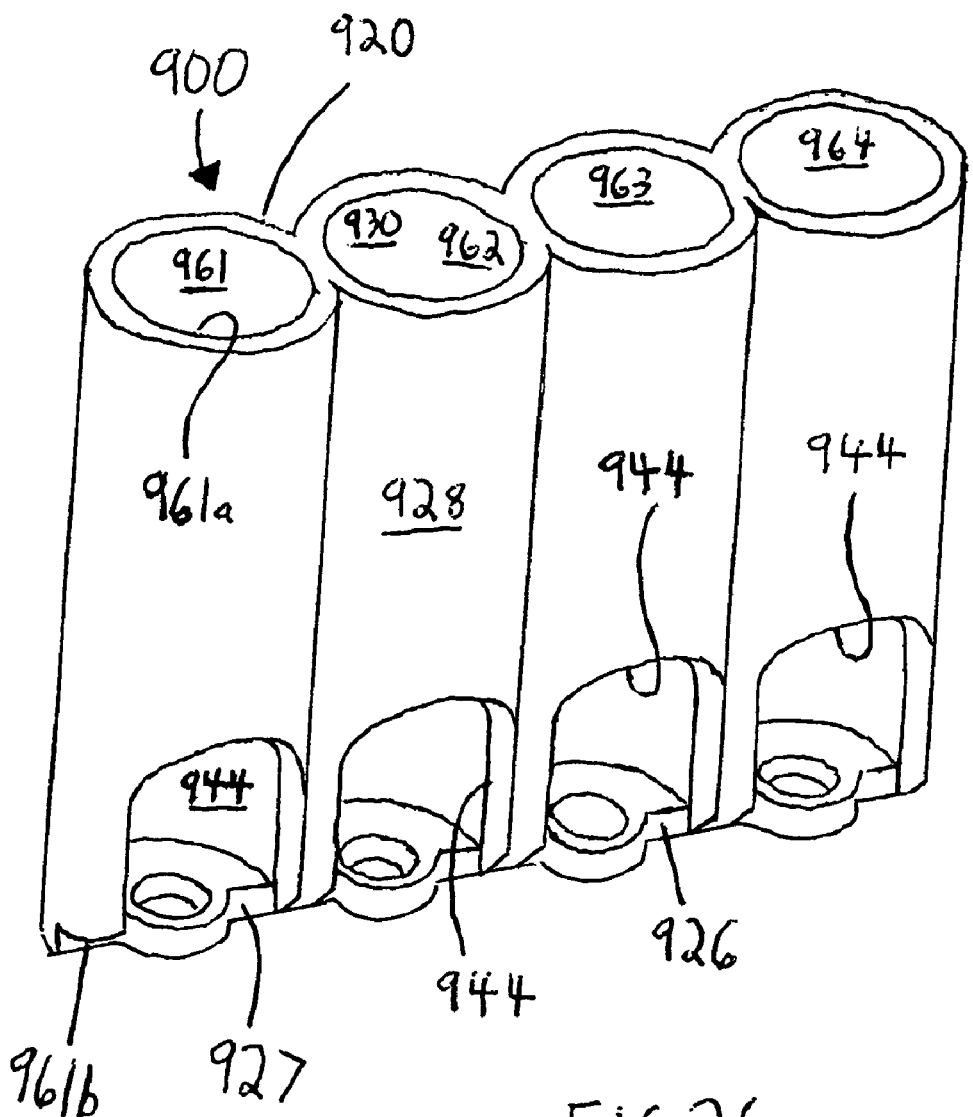
FIG. 26 is a perspective view of a further embodiment battery holder of the invention.

According to the preferred embodiment illustrated in FIG. 26, the frame is preferably injection molded plastic having an average thickness "TH" (FIG. 29) of about 2 mm.

According to the embodiment of FIGS. 26-29 the frame 920 provides four bays 961-964 that are generally formed as cylindrical tubes. Each bay includes a top opening 961a and a bottom opening 961b that is partially closed by the bottom wall 926. Each bay also includes the lower sidewall opening 944 that is open to the bottom opening 961b. The opening 944 can be about ⅜ inch tall and circumscribes about 90°-120° of the circumference of the cylindrical tube.

As shown in FIG. 26, the bottom wall 926 includes an irregular longitudinal edge 927 that extends along the longitudinal extent of the frame 920. The edge 927 is recessed from a lateral extent of the bays to limit the bottom openings 961b and to expose the bottom surface "S" of the batteries "B" held within the bays to a user's touch to allow the user's finger to press the batteries from below. The bottom wall 926 also provides apertures 928 for the bays to receive the positive terminal "T" of a typical battery "B".

According to the invention, a top packaging membrane 980 such as a polymer film or a foil closes the top opening 961a and retains the battery "B" within the bay. A bottom membrane 982, such as a polymer film or foil closes the bottom openings 961b, 944. The membranes 980, 982 can comprise shrink wrap films or foils, or adhesively secured membranes. Preferably, the top membrane 980 is one wherein sufficient upward force by a battery with respect to the frame 920 will cause a bursting or tearing of the foil by the thrusting battery and allow removal of the battery. Alternately, the connection between the membrane and the frame could be designed, such as by adhesive selection, such that the membrane could be broken away from the frame, without necessarily tearing, by user force on the battery to allow removal of the battery. The lower membrane 982 can be selected such that radial inward force on the membrane 982 either tears, separates the membrane from the frame, or stretches the membrane such that the user's finger can underlie the battery bottom edge within the compartment, whether by direct contact or through the thickness of the membrane 982, to thrust the battery upward and through or past the top membrane 980.

The lower membrane 982 can be on an inside surface of each bay as shown or on an outside surface as shown by 982'. According to an exemplary embodiment, the lower membrane 982 (or 982') seals each bay individually so that if one battery is removed and the membrane 982 (or 982') is ruptured or otherwise opened, the sealed integrity of the remaining bays by the membranes 982 (or 982') is maintained.

The invention of FIGS. 26-29 allows for packaging of the batteries for retail and also provides a battery holder that can have all the convenience attributes set forth in the initially described embodiment. The membranes 980, 982 can surround the frame 920 and batteries to seal off the batteries completely from the ambient atmosphere. This makes the retail battery package waterproof or water resistant and protects the batteries from dirt and debris.

FIGS. 30-34 illustrate an alternate battery holder 1000 including a frame 1020 that can hold a plurality of batteries "B" (FIG. 32). The frame 1020 is preferably a unitary molded piece. The frame 1020 includes a bottom wall 1026 and sidewalls 1028, 1030. One of the sidewalls 1028 includes an upper row of openings 1038 and a lower row of openings 1044. In the illustrated embodiment, the sidewalls 1028, 1030 have outside partial-cylindrical contours that are substantially parallel to the outside contours of the batteries held within the frame 1020. Thus, even in a dark environment, a user can, by feel of the outside contour of the frame 1020, ascertain the size of a battery held within the frame. Furthermore, the openings, either the upper row 1038 or the lower row 1044 can be sized sufficiently such that a user's finger can actually directly feel the outside contour of a battery held within the frame to determine the size of the battery, even in the dark.

The sidewall 1030 includes an intermediate, vertically arranged elongated opening 1045.

The batteries held within the frame are exposed through the openings 1038, 1044, 1045. Furthermore, the bottom wall 1026 is recessed adjacent each of the lower row of openings 1044 such that a bottom surface "S" of a battery held within the frame is exposed to a user's touch.

According to the embodiment, the frame 1020 is preferably injection molded plastic having an average thickness "TH" (FIG. 33) of about 2 mm.

Bays 1061-1064 are formed as cylindrical tubes which include a top opening 1061a and a bottom opening 1061b that is partially closed by the bottom wall 1026. The lower sidewall opening 1044 is about ⅜ inch tall and circumscribes about 90°-120° of the circumference of the cylindrical tube. The bays 1061-1064 each includes an upper sidewall opening 1038 that is about ⅜ inch in height and circumscribes about 90°-120° of the cylindrical tube circumference.

The bottom wall 1026 includes an irregular longitudinal edge 1027 that extends along the longitudinal extent of the frame 1020. The edge 1027 is recessed from a lateral extent of the bays to limit the bottom openings 1061b and to expose the bottom surface "S" of the batteries "B" held within the bays to a user's touch to allow the user's finger to press the batteries from below. The lower sidewall openings 1044 of the bays are contiguous with the bottom openings 1061b formed by the edge 1027 to allow the user's finger to not only press the bottom surface "S" of the batteries but to slide the batteries toward the top open ends of the bays to eject the batteries.

The bottom wall provides apertures 1028 for the bays to receive the positive terminal "T" of a typical battery "B". Because of the apertures 1028, a battery can be put into the compartment with the extending terminal either oriented at the top or bottom of the battery.

FIGS. 33 and 34 illustrate the frame 1020 in more detail with the batteries removed. A metallic spring detent 1090 is fixed to the frame 1020 within each bay 1061-1064 for releasably holding a battery "B" within individual bays. The detent 1090 is set within a slot 1091 at the top end of the bay. The detent 1090 includes a base portion 1092 that is embedded or molded into the plastic material of the frame 1020. The detent 1090 also includes a shallow, Z-shaped clasp portion 1094 that is cantilevered from the base portion 1092 and is resiliently biased to a position within the top opening 1061a but can be resiliently deflected away from the top opening 1061a, outwardly, in order to insert or remove a battery through the top opening 1061a.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In combination, a battery holding and dispensing apparatus for holding and dispensing household batteries, and a plurality of batteries each having a first end, an opposite, second end and a lengthwise body between the first and second ends with an electrical terminal provided on the first end or both ends, with the body being free of electrical terminals, the battery having a lengthwise centerline oriented to intersect centers of the first and second ends, the battery holding and dispensing apparatus comprising:

a first frame including a plurality of compartments, each compartment sized and configured to hold one of said plurality of batteries and having a bottom wall, an open end, and a surrounding sidewall defining a space within the compartment between the open end and the bottom wall and a compartment centerline oriented to intersect a center of the open end and centered in the space defined by the surrounding sidewall, the compartment centerline being collinear with the lengthwise centerline of the battery when inserted into the compartment through the open end, each said surrounding sidewall sized to have a length along said respective compartment centerline that is equal to or greater than a length of a corresponding battery along said battery centerline such that the battery fits in the compartment, said first frame composed of molded plastic; and a plurality of detents, one detent protruding into a respective open end of each said compartment in order to retain a battery in said compartment, each detent resiliently displaceable from the respective open end to allow removal of the battery from the respective compartment through the respective open end, each detent being composed of molded plastic and formed in unitary fashion with the first frame.

2. The combination according to claim 1, wherein said compartments are arranged to hold said batteries oriented side-by-side in parallel.

3. The combination according to claim 1, wherein said frame is composed of a luminescent plastic.

4. The combination according to claim 1, further comprising a container having a lid, said container sized to fit within one of said compartments.

5. The combination according to claim 1, wherein each of said compartments comprise a bottom wall having an opening exposing a bottom portion of a battery within said compartment.

6. The combination according to claim 1, wherein said compartments include at least one opening through a sidewall thereof.

7. The combination according to claim 1, wherein said frame is elongated and sized to be held in a user's hand.

8. The combination according to claim 1, wherein opposite ends of each compartment are open and sized to pass a battery therethrough, and said plurality of detents comprises a detent adjacent each end protruding into said compartment, said battery retained in said compartment by said detents.

9. The combination according to claim 1, wherein at least one of said compartments comprises a lid.

10. The combination according to claim 1, wherein said compartments are of varying sizes to accommodate a collection of batteries a various battery sizes.

11. The combination according to claim 1, wherein said each compartment comprises a bottom with an opening to accommodate a protruding terminal of a battery fit within said compartment.

12. The combination according to claim 1, wherein each said compartment comprises an external rounded sidewall having a contour substantially parallel to an outside contour of a battery held therein.

13. The combination according to claim 12, wherein said external rounded sidewall includes an opening, wherein a user's finger can contact a battery within said compartment through said opening.

14. The combination according to claim 1, further comprising a second frame, said second frame including a plurality of compartments, each compartment sized and configured to hold a battery, each compartment including a means for releasably holding a battery within the compartment; wherein said first frame and said second frame are releasably interconnected together.

15. The combination according to claim 14, comprising a first engagement means on said first frame and a second engaging means on said second frame, said first and second engagement means for mutual engagement to releasably connect said first frame to said second frame.

16. The combination according to claim 1, comprising at least one lamp carried by said first frame, and a conductor pair connecting said lamp to a battery carried by said first frame.

17. The combination according to claim 16, comprising a switch connected in series to one of said conductors.

18. The combination according to claim 17, wherein said conductor pair are embedded into a bottom wall of said first frame.

19. The combination according to claim 17, wherein said lamp comprises an LED and is located within a void between compartments.

20. The combination according to claim 16 wherein said lamp and said conductor pair are carried on a sub frame that is sized to be removably carried by said frame.

21. The combination according to claim 20, comprising a switch connected in series to one of said conductors.

22. The combination according to claim 20, wherein said conductor pair are embedded into a bottom wall of said sub frame.

23. The combination according to claim 22, wherein said lamp comprises an LED.

24. In combination, a battery holding and dispensing apparatus for holding and dispensing household batteries, a plurality of batteries, each having a first end, an opposite second end and a lengthwise body between the first and second ends with an electrical terminal provided on the first end or both ends with the body being free of electrical terminals, the battery having a lengthwise centerline oriented to intersect centers of the first and second ends, the battery holding and dispensing apparatus comprising:

a first frame including a plurality of compartments, each compartment sized to contain one battery of said plurality of batteries therein and having a sidewall to hold said one battery with longitudinal centerline of the one battery in the compartment held in an upright orientation, each sidewall having an opening wherein a user can touch with a finger the one battery held in the compartment through the opening to ascertain a battery size, and the compartment having a top opening for dispensing of the one battery in a direction parallel to the lengthwise centerline of the one battery, the first frame being composed of a unitary injection molded plastic and having a protrusion into each compartment to retain a battery therein.

25. The combination according to claim 24, wherein said compartments are arranged to hold said batteries oriented side-by-side in parallel.

26. The combination according to claim 24, wherein each protrusion comprises a detent protruding into the top opening of said compartment, said detent resiliently displaceable from said top opening to allow removal of said battery from said compartments through said top opening.

27. The combination according to claim 24, wherein said frame is composed of a luminescent plastic.

28. The combination according to claim 24, further comprising a container having a lid, said container sized to fit within one of said compartments.

29. The combination according to claim 24, wherein said compartments comprise a bottom wall having an open area exposing a bottom portion of a battery within said compartment.

30. The combination according to claim 29, wherein said compartments each include at least one opening through a sidewall thereof that is contiguous with said open area.

31. The combination according to claim 24, wherein said frame is elongated and sized to be held in a user's hand.

32. In combination, a battery holding and dispensing apparatus for holding and dispensing household batteries, a plurality of batteries, each having a first end, an opposite second end and a lengthwise body between the first and second ends with an electrical terminal provided on the first end or both ends with the body being free of electrical terminals, the battery having a lengthwise centerline oriented to intersect centers of the first and second ends, the battery holding and dispensing apparatus comprising:

a first rigid plastic frame, said first rigid frame including a plurality of compartments, each compartment having a first wall thickness and sized and configured to hold a single battery of said plurality of batteries completely therein and separated from the respective other compartments, each compartment including a top opening and a bottom opening, said bottom opening allowing a user to push said single battery with a finger toward said top opening, the compartments each having a compartment vertical centerline intersecting a center of the top opening, the compartment vertical centerline is aligned with the single battery lengthwise centerline such that the single battery is pushed through the compartment in a direction parallel to the battery lengthwise centerline, the compartment vertical centerlines in the rigid plastic frame all being parallel; and a first membrane covering said top opening, said first membrane having a second wall thickness that allows said first membrane to tear, or the connection between the first membrane and the first frame has a strength to allow the first membrane to break away from said frame, when sufficient force by the user's finger pushes the single battery through or past the first membrane, said first wall thickness being thicker than said second wall thickness.

33. The combination according to claim 32, wherein said compartments are arranged to hold said batteries oriented side-by-side in parallel.

34. The combination according to claim 32, further comprising a second membrane covering said bottom opening, said second membrane having a thickness that allows the user's finger to push the battery through the first membrane.

35. The combination according to claim 34, wherein said second membrane is selected to be able to stretch for a user to press against said battery through a thickness of said second membrane.

36. The combination according to claim 34, wherein said second membrane is selected to be able to break or break away from said frame for a user to press against said battery through the broken said second membrane.

37. The combination according to claim 34, wherein said first membrane comprises a foil material.

38. The combination according to claim 34, wherein said first and second membranes comprise foil material.

39. The combination according to claim 34, wherein said first and second membranes comprise polymer film material.

40. The combination according to claim 36, wherein said first membrane comprises a foil or film material that is breakable and said and second membranes comprises an elastic material.

* * * * *